Jan. 23, 1968 G. W. BROWN ET AL 3,364,515
DEVICE FOR SEPARATION OF JOINTED ANIMAL MEMBERS
Filed April 12, 1965 3 Sheets-Sheet 1

INVENTORS
GEORGE W. BROWN
ERNEST E. LEWIS

BY

Newton, Hopkins,
Jones & Ormsby
ATTORNEYS

Jan. 23, 1968 G. W. BROWN ET AL 3,364,515
DEVICE FOR SEPARATION OF JOINTED ANIMAL MEMBERS
Filed April 12, 1965 3 Sheets-Sheet 2

INVENTORS
GEORGE W. BROWN
ERNEST E. LEWIS
BY
Newton, Hopkins,
Jones & Ormsby
ATTORNEYS Jan. 23, 1968   G. W. BROWN ET AL   3,364,515
DEVICE FOR SEPARATION OF JOINTED ANIMAL MEMBERS
Filed April 12, 1965   3 Sheets-Sheet 3
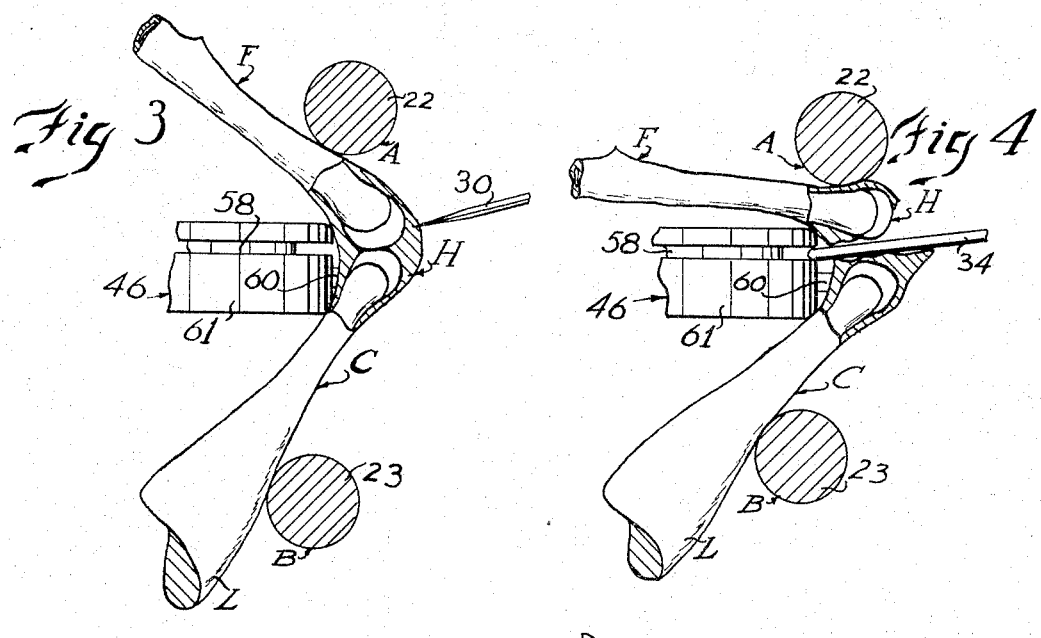
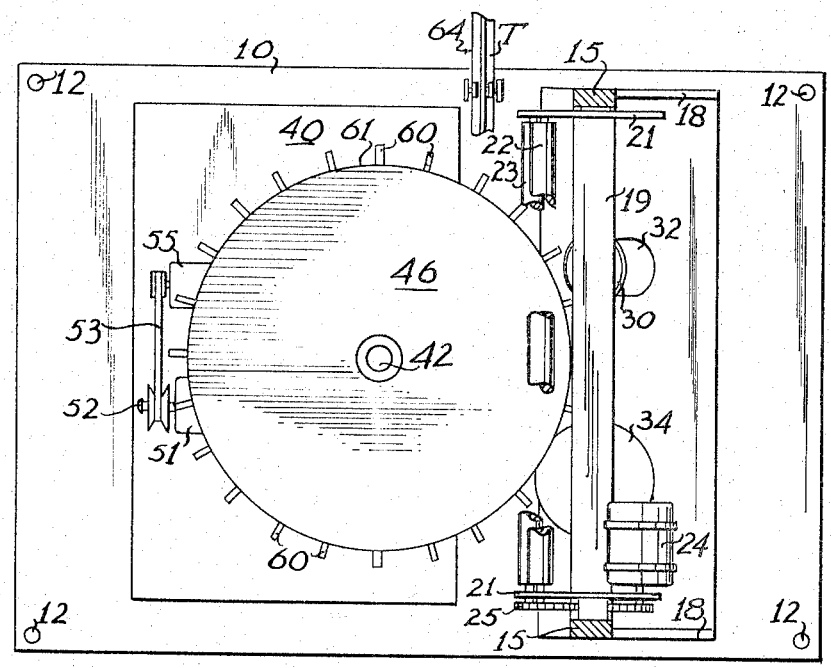
INVENTORS
GEORGE W. BROWN
ERNEST E. LEWIS
BY Newton, Hopkins, Jones & Ormsby
ATTORNEYS

United States Patent Office 3,364,515
Patented Jan. 23, 1968

3,364,515
DEVICE FOR SEPARATION OF JOINTED ANIMAL MEMBERS
George W. Brown, Atlanta, and Ernest E. Lewis, Gainesville, Ga., assignors to Gainesville Machine Company, Inc., Gainesville, Ga., a corporation of Georgia
Filed Apr. 12, 1965, Ser. No. 447,299
8 Claims. (Cl. 17—11)

ABSTRACT OF THE DISCLOSURE

Apparatus for separation of jointed animal members, particularly for severing the hocks of fowl in automatic progressive succession in the processing of fowls. The apparatus includes means for progressively bending and stretching the hocks about a movable positioning member, a first cutting member for making an incision into the joint of the hock adjacent its lower leg portion, and a second cutting member for completely separating the hock along the line of the incision.

Background of the invention

In the preparation of a fowl for marketing and/or for various food processing operations, the dismemberment of the foot from the carcass of the fowl at the hock is required, the foot portion below the hock having no commercial value as a food product for human consumption. While a wide variety of automatic equipment has been developed for various automatic operations in the preparation of fowl for subsequent use, the severing of the hock joint to dismember the foot from the leg has heretofore been most commonly accomplished by a manual operation. Such manual operations are, of course, costly and time consuming.

It is also important in the processing of fowl that as much of the meat of the hock as possible be retained on the leg portion of the fowl to produce more salable weight. This may be achieved by cutting the hock toward the foot before severing the hock completely so as to include more of the meat of the hock on the leg. Although this small piece of meat retained on the leg is virtually insignificant on one fowl, it becomes quite significant in the processing of many fowl per day. Manual operations of dismembering of the joint have cut the hock directly through that portion where the bones are joined and therefore have the disadvantage of not including the additional meat from the foot portion.

Summary of the invention

It is also important to note that, in the manual dismemberment of the hock, an operator may occasionally cut into the bone of the foot or the leg. Any incision or fragmentation of the bone structure is objectionable, and frequently results in rejection of the fowl by health authorities as a marketable product.

It is among the primary objects of present invention to provide an apparatus for automatically and successively dismembering the foot portions of fowl from the leg portions thereof at the hock.

Another object of the present invention is to provide a mechanism whereby the hocks of fowl can be uniformly, automatically, successively and accurately severed in accordance with a predetermined standard of operation.

Another object of the present invention is to provide automatic means for successively severing the hock in such manner as to maximize the weight of the usable portion of the animal.

Another object of invention is to provide apparatus for automatically and successively severing hock joints without any incision or mutilation of any of the bone structure of the hock.

A further object of invention is to provide a novel method of severing the hock joints of fowl to dismember the foot from the leg.

Numerous other objects, features and advantages of the present invention will be apparent from a consideration of the following specification taken in conjunction with the accompanying drawings wherein like characters of reference designate corresponding parts throughout and which:

Brief description of the drawing

FIGS. 3 and 4 are fragmentary detailed views of that portion of the apparatus by which the hock is bent and dismembered by two successive stages in the operation of the apparatus; and, FIG. 5 is a plan view of the apparatus of the present invention as shown in FIGS. 1 and 2 with portions thereof broken away.

Disclosure of an embodiment

A specific embodiment of the present invention is disclosed herein which illustrates one means for accomplishing the method of present invention, however, it is to be understood that the invention is not limited by the embodiment disclosed herein since it may be embodied in other equivalent forms.

Figure 1:
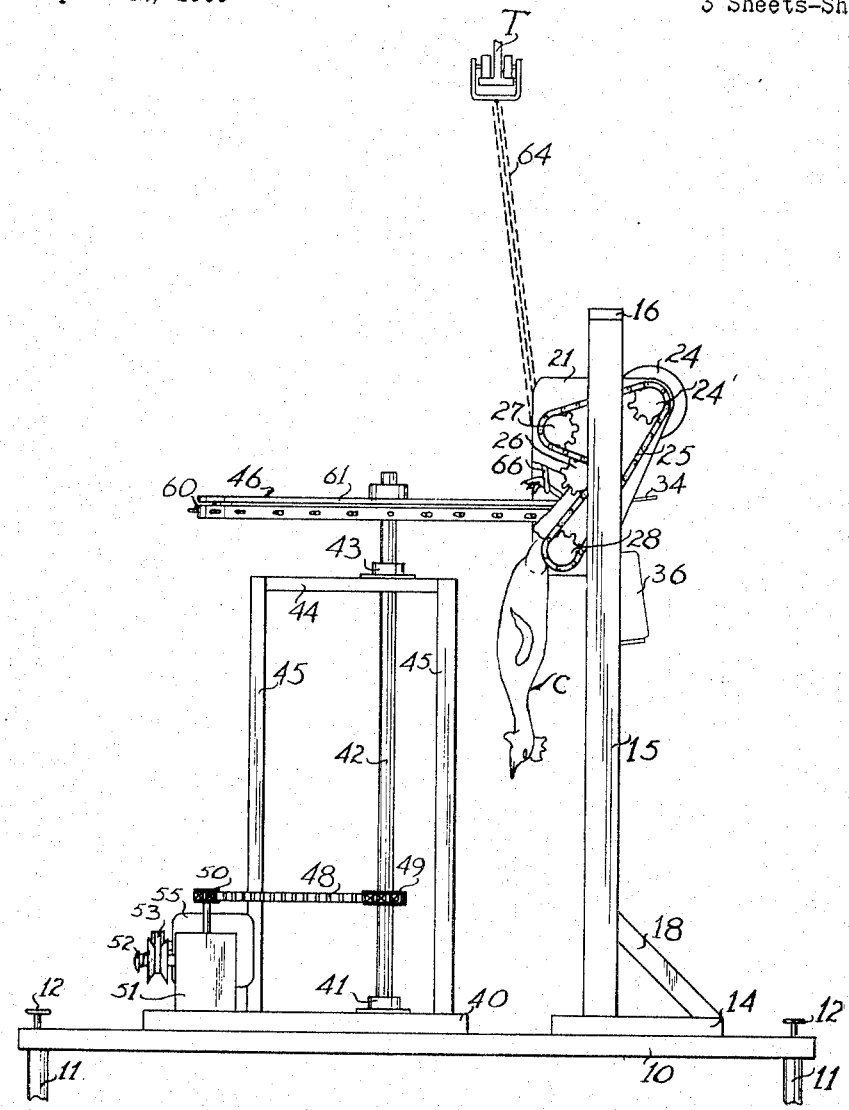
FIG. 1 is an end elevation, looking in the direction opposite fowl travel, of one form of the apparatus of the present invention.

In the drawings, numeral 10 designates a flat, generally rectangular base for the support of the operative instrumentalities of the machine as hereinafter set forth. The base 10 may be supported at any desired elevation by corner posts 11. Conventional positioning means provided in the posts 11 having adjusting wheels 12 associated therewith are preferably provided for assuring a level, horizontal position of the bed or frame on a floor which may be of uneven contour. Mounted on the base 10 at the right-hand end as shown in FIGS. 1 and 5, is a support member 14 of generally rectangular form disposed transversely of the base 10. At the opposite ends of the support member 14, parallel vertically extending stanchions 15 are provided and are joined at their upper ends by a transverse tie beam 16. A brace 18 may be provided for bracing each of the vertical stanchions 15.

Figure 2:
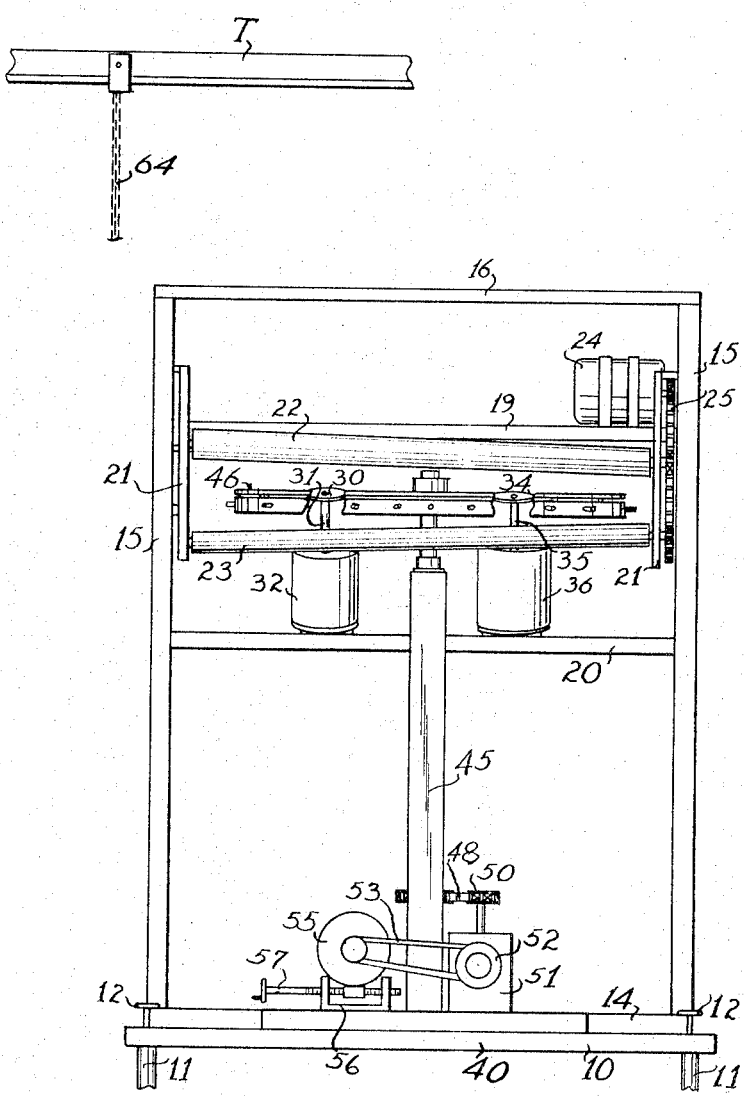
FIG. 2 is a front elevation of that form of the apparatus shown in FIG. 1 with a portion broken away to show arrangement of the knives that are discussed below.

Intermediate the length of the stanchions 15 and joined thereto in vertical, spaced relation are upper and lower transverse frame beams 19 and 20 respectively, defining a transverse frame work. Extending forwardly from the stanchions 15 between frame beams 19 and 20 there are provided roller bearing plates 21 which rotatably mount upper and lower hock angle forming rolls 22 and 23 respectively which are mounted on axes that converge in the direction of movement of animal members that are undergoing separation as depicted in FIG. 2. As seen in FIG. 5 the axes of the rolls 22 and 23 lie in horizontally spaced vertical planes, the lower roll 23 being slightly forward of the upper roll 22. The rolls 22 and 23 are driven in opposite directions by motor 24 and its drive sprocket 24' through a chain 25, the motor 24 being mounted on the upper frame beam 19.

The endless chain 25 extends over idler sprocket 27, thence over drive sprocket 26 of roll 22, then over the drive sprocket 28 of the roll 23 and over the drive sprocket 24' as shown in FIG. 1. Referring to FIG. 2, it is seen that this is the point of closest proximity of the rolls 22 and 23 to each other.

To the left of the support member 14 in FIGS. 1 and 5 there is provided a second support member 40 on the base 10. Journaled on the second support member 40 and 41 is the lower end of a vertically extending, positioning wheel drive shaft 42. The upper intermediate portion of the positioning wheel drive shaft 42 is guided in bearings 43 of a cross beam 44 which is supported by standards 45, the standards rising from the second support member 40. A positioning wheel 46 is horizontally mounted on the uppermost end of the shaft 42 as seen in FIGS. 1 and 5 and is rotated by a motor 55 through a speed reduction unit 51 and a chain 48, the chain 48 encircling a sprocket 49 on the shaft 42 and a drive sprocket 50 on the speed reduction unit 51. The speed reduction unit 51 is driven at a selectively variable speed by speed selector pulley 52 and a belt 53 from the motor 55, the motor being adjustably mounted in a cradle 56 as shown in FIG. 2. The arrangement is such that the speed of rotation of positioning wheel 46 can be readily varied by a simple adjustment, through the crank 57, of the motor 55 within the cradle 56. As shown in FIG. 1, the speed reduction unit 51 is mounted directly on the second support member 40.

Referring to FIGS. 3 and 4, it is seen that the positioning wheel 46 is formed with a peripheral, inwardly extending recess 58; and, therebelow, the wheel is provided with radially projecting hock guiding pins 60.

Within the framework defined by the frame beams 19 and 20, there is provided, to the left in FIG. 2 and shown also in FIG. 5, a high speed, sharp-edged small diameter circular cutting knife 30 for making an initial incision into a hock, the knife 30 being mounted on the inclined shaft 31 of its motor 32. The motor 32 that drives knife 30 is mounted on a plate 32' fixedly attached to the lower frame beam 20. The knife 30 is positioned so that its periphery is spaced above and outwardly of the periphery 61 of the wheel 46 as further described hereinafter. In this particular embodiment of the invention, the knife 30 is tilted downwardly toward the periphery 61 of the wheel 46 at an angle of 14 degrees, although it is understood that this angle will change with different kinds of fowl. Parallel to, and to the right of, knife 30 in FIG. 2, there is provided a larger circular knife 34 for joint separation. This larger knife 34 is rotated at a slower speed than the sharp knife 30 and is provided with a rounded, or somewhat dull, periphery. The knife 34 is driven by the inclined shaft 35 of motor 36, the motor 36 being mounted on a plate 36 fixedly attached to the beam 20.

The knife 34 is positioned so that its outer periphery just projects into the recess 58 in the wheel 46. This serves to sever any portion of the fowl that passes between it and the wheel 46. The knife 34 is inclined downwardly toward the wheel 46. In this particular embodiment of the invention it is inclined downwardly at an angle of 7 degrees, however, it is understood that the angle will vary when different types of fowl are being processed.

For feeding the fowl in head-downward position in a line of movement substantially tangential to the periphery 61 of the positioning wheel 46, a conventional chain conveyor 64 is provided, having pivotally mounted fowl foot engaging shackles 66 as shown in FIG. 1.

In this construction, it will be noted that the track T of the conveyor is above, and lies along a secant of, the positioning wheel 56; and, the fowl foot engaging shackles 66 are suspended on chains so that they are free to move about with respect to the track T of the conveyor 64. The fowl, indicated by the letter C, is suspended head-downward with the hock joint, generally indicated by the letter H in FIGS. 3 and 4, at the center of the plane defined by the wheel recess 58. Further, it will be noted that, as the fowl C passes adjacent the periphery of the wheel 46, it will be contacted by the outer faces A and B of the rolls 22 and 23 respectively in FIG. 3 and FIG. 4.

FIG. 3 shows the fowl C just after contacting the periphery 61 of the wheel 46 and in position so that it is being cut by the sharp knife 30. The rolls 22 and 23 bend the hock H around the periphery 61 of the wheel 46 by forcing the leg L and foot F over the wheel 46. This serves to position the hock H so that the knife 30 can make an incision into the meat of the hock H so that only the meat and tendons of the hock are cut. It will be noted that the incision made by the knife 30 is made as near the foot of the fowl as possible. Moreover, it will be noted that the incision is made at an angle so that it will open up in a particular manner as will be explained hereinafter.

FIG. 4 shows the fowl C after it has passed that point between the rolls 22 and 23 where the wheel 46 projects the furthest between the rolls, and the fowl is in the position where the knife 34 completely severs the hock H. The rolls 22 and 23 are now positioned closer together so that the hock H is bent further than shown in FIG. 3. This serves to open up the incision made by the knife 30 so that the knife 34, although lower than the knife 30, can enter the incision and separate the bones of the hock H and finish severing the hock. This then allows more of the meat of the hock H to be retained on the leg L.

*Operation*

In operation, the wheel 46 is rotated in a clockwise manner as seen in FIG. 5, and the fowl C is moved toward the rotating wheel 46 by the conveyor 64, from left to righ as seen in FIG. 2. It is to be understood that the length of the chain associated with the conveyor 64 is such that the hock H of the fowl C is in a position adjacent the edge 61 of the wheel 46 when the conveyor 64 moves the fowl C into a position adjacent to the wheel 46. For small adjustments necessary to position the hock H properly adjacent the periphery 61 of the wheel 46, the adjusting wheels 12 may be rotated to raise or lower the wheel 46 the desired amount by raising or lowering the base 10. When the periphery 61 of the wheel 46 strikes the hocks H of the fowl C, it forces hocks H of the fowl C between the rolls 22 and 23 at their ends which are furthest apart. This tends to wrap the foot F and the leg L around the edge 61 of the wheel 46 so that the hock H is bent. The pins 60 serve to prevent the fowl C from slipping away from the edge 61 of the wheel 46 and damaging the fowl C during movement through the device.

As the fowl C is moved around the periphery 61 of the wheel 46, the hocks are engaged by the circular knife 30, which is rotating at a high speed. The knife 30 cuts into the hock H on the foot side thereof to just sever the meat portion and tendons of the hock. The knife 30 is sufficiently removed from the wheel 46 so that it cannot completely sever the foot from the leg; rather, the knife 30 makes a preliminary incision just above the point at which the foot will later be severed. This is shown clearly in FIG. 3.

As the fowl C moves further with the edge, or periphery 61, of the wheel 46, the hocks H are bent more severely because the rolls 22 and 23 become closer together in this direction of travel. This more severe bending tends to separate the bones, and open the incision made by the knife 30; thus, the dull knife 34 can enter the incision made by the sharp knife 30, extend between the bones of the hock H and completely separate the joint, without damaging the cartilage of the hock H. Because the knife 34 is dull it will not cut into the cartilage of the hock but will merely cut tendons or the like to separate the joint. Also, the knife 34 extends into the recess 58 of the wheel 46 so that severance through the hock H is definitely assured through scissors action. This is shown clearly in FIG. 4.

In order to facilitate the operation, the bottom roll 23 is roughened somewhat, and is rotated in a counterclockwise direction as viewed in FIGS. 3 and 4. The top roll 22 is smooth, but is rotated in a clockwise direction as viewed in FIGS. 3 and 4. Since the rolls 22 and 23 rotate in opposite directions, they tend to pull the bones of the hock H in opposite directions to separate the joint further; and, since the rolls 22 and 23 are placed along a secant of the wheel 46, the foot and leg will be bent over the wheel 46 to locate the hock properly around the periphery thereof engaged by the knives 30 and 34 in the desired fashion.

After the joint has been completely severed, the fowl will fall into a suitable receptacle or the like (not shown), to be removed for further processing.

It will, of course, be understood by those skilled in the art that the device here presented is by way of illustration only, and is meant to be in no way restrictive; therefore, numerous changes and modifications may be made, and the full use of equivalents resorted to without departing from the spirit or scope of the invention as defined by the appended claims.

We claim:

1. A poultry leg cutter for severing the shanks from the hocks of the legs including positioning means, a pair of vertically offset, horizontally inclined, oppositely driven, spaced and elongated rolls for bending hocks at their joints about said positioning means, and a pair of horizontally spaced, dissimilar cutting members mounted so as to successively cut and separate each hock at its joint while the hock is bent.

2. A machine for severing an animal joint comprising means for successively bending the joint, said means including a pair of oppositely rotating relatively inclined rolls for engaging the joint at each side thereof, and a pair of longitudinally spaced joint separating means, one of said separating means being relatively sharper than the other, whereby the joint is bent to a first position and the sharper of the separating means cuts through a portion of the meat of the joint, and the joint is bent to a second position and the other of the separating means separates the joint.

3. The invention of claim 2 and further including conveying means for suspending the animal from its feet so that its leg joint is moved into engagement with said rolls.

4. The invention of claim 2 and further including a positioning means disposed between said rolls for urging the joint between said rolls.

5. The invention of claim 2 wherein one of said rolls has a relatively smooth surface and the other of said rolls has a relatively rough surface.

6. The invention of claim 2 wherein said rolls converge toward each other from the sharper of the joint separating means toward the other of the joint separating means.

7. The invention of claim 2 and further including a positioning member for urging the joint between said rolls and wherein said joint separating members are positioned with respect to said rolls and said positioning member so as to sever the meat of the joint at a position closer to one bone of the joint than the other bone.

8. The invention of claim 2 and further including a positioning member for urging the joint between the rolls, and wherein the other of the separating means is positioned in a scissor-like relationship with said positioning member to sever the meat of the joint.

References Cited

UNITED STATES PATENTS

| | | | |
|---|---|---|---|
| 3,017,660 | 1/1962 | Reeves | 17—12 |
| 3,038,197 | 6/1962 | Turner | 17—11 |
| 3,137,892 | 6/1964 | Best et al. | 17—11 |
| 3,199,143 | 8/1965 | Ousley et al. | 17—11 |
| 3,213,488 | 10/1965 | Volpe | 17—11 |

LUCIE H. LAUDENSLAGER, *Primary Examiner.*